(12) United States Patent
Jansson et al.

(10) Patent No.: US 6,345,251 B1
(45) Date of Patent: Feb. 5, 2002

(54) LOW-RATE SPEECH CODER FOR NON-SPEECH DATA TRANSMISSION

(75) Inventors: Fredrik Jansson, Sundbyberg; Erik Ekudden, Akersberga, both of (SE); Karl Hellwig, Wonfurt (DE); Tomas Frankkila, Lulea (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/333,890

(22) Filed: Jun. 15, 1999

(51) Int. Cl.[7] .............................................. G10L 19/00
(52) U.S. Cl. ...................... 704/270; 704/500; 379/88
(58) Field of Search .............................. 704/270, 275, 704/500; 370/280; 379/88

(56) References Cited

U.S. PATENT DOCUMENTS

| | | | | |
|---|---|---|---|---|
| 5,706,282 A | * | 1/1998 | Chung | 370/280 |
| 5,734,678 A | * | 3/1998 | Paneth et al. | 375/240 |
| 5,951,709 A | * | 9/1999 | Tanaka | 714/355 |
| 6,014,374 A | * | 1/2000 | Paneth et al. | 370/345 |

FOREIGN PATENT DOCUMENTS

| | | |
|---|---|---|
| EP | 0663785 A | 7/1995 |
| EP | 0797366 A | 9/1997 |
| WO | 98/24253 A | 6/1998 |

* cited by examiner

Primary Examiner—Richemond Dorvil
Assistant Examiner—Susan McFadden
(74) Attorney, Agent, or Firm—Burns, Doane, Swecker & Mathis, L.L.P.

(57) ABSTRACT

Low rate data signals, such as standard TTY signals and standard DTMF signals, can be effectively analyzed and encoded by speech encoders employed in conventional digital cellular system. This is accomplished by providing a low rate data encoder in the transmission path of the low rate data signal, just prior to the speech encoder used by the digital cellular system. In so doing, the standard, low rate data signal is transformed (i.e., modified) by the low rate data encoder into a signal that is more compatible with the speech encoder. Similarly, a low rate data decoder is provided at the receiving end of the transmission path to decode the modified, low rate data signal.

8 Claims, 6 Drawing Sheets

LOW-RATE SPEECH CODER FOR NON-SPEECH DATA TRANSMISSION

FIELD OF THE INVENTION

The present invention relates to the field of telecommunications. More particularly, the present invention relates to cellular telecommunications for hearing impaired persons.

BACKGROUND

For quite some time, Teletype devices (TTY) have been employed in conjunction with conventional telephone systems. In so doing, hearing impaired persons have been able to directly access telephone networks. It should be noted that TTYs that are employed specifically for hearing impaired persons are often referred to as Telecommunications Devices for the Deaf or TDDs. In general, TTYs include a keyboard, or like devices, and a display. Accordingly, a sending party wishing to communicate with a receiving party would then type a string of desired characters (i.e., letters, numbers or other available characters) using the keyboard. Each character is then encoded using a 5 bit coding sequence. A modem then generates a teletype (TTY) signal by converting the bit sequence into a 45.45 bit/sec Frequency Shift Keying (FSK) modulated signal. The TTY signal is then transmitted to the receiving party over the telephone line. A TTY at the receiving end of the telephone line demodulates the TTY signal and decodes the resulting bit sequence into a series of characters, which are displayed for the receiving party.

Figure 1:
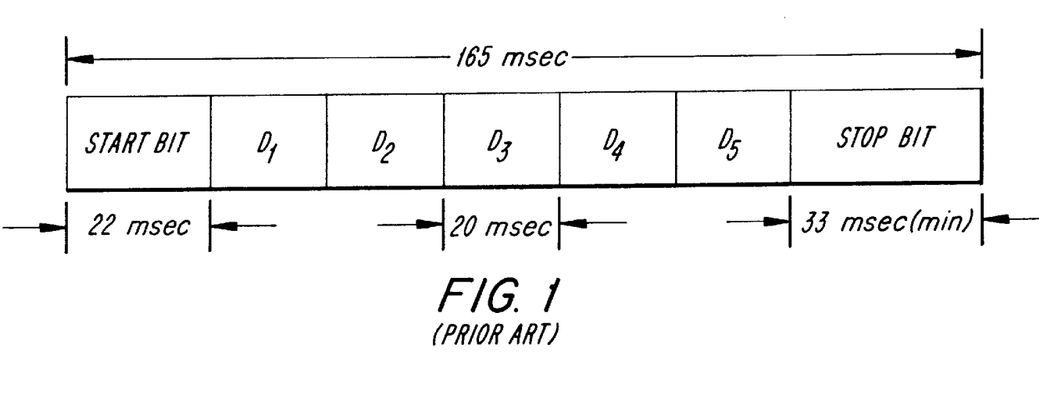
FIG. 1 illustrates a TTY protocol.

FIG. 1 illustrates, in more detail, the TTY signal protocol. As stated, each character is encoded into a 5 bit sequence D1–D5. In addition, a stop bit and a start bit are appended to each 5 bit sequence. In order to encode letters, numbers and other available characters using a 5 bit code, two separate character sets are employed. The sending party can then switch back and forth between the two character sets by transmitting a control character, which the sending party accomplishes by depressing one of two dedicated keys on a standard TTY keyboard. The first key is marked LTRS whereas the second is marked FIGS.

With the development of wireless telecommunications, efforts have been undertaken to give hearing impaired persons similar access to wireless networks, such as mobile telecommunications networks, including cellular networks. In fact, in the United States, it is now a requirement that cellular networks have the capability to transport TTY signals. In cellular systems such as the Advanced Mobile Phone System (AMPS), which is an analog system widely employed throughout the United States, TTY signals are transmitted with little or no difficulty. However, transmitting TTY signals over digital cellular systems, such as the Digital AMPS (D-AMPS) and the Global System for Mobile Telecommunications (GSM), is problematic.

The primary reason why transmitting TTY signals over digital cellular systems is problematic is that digital cellular systems employ speech coders. A speech coder, in turn, employs a speech production model which is optimized for analyzing and encoding speech signals based on certain assumptions which are valid only for speech signals, such as the number of spectral peaks in the signal, the maximum rate of change in the spectrum of the signal and the pitch frequency of the signal. However, TTY signals are significantly different from speech signals. Accordingly, speech coders used in conventional, digital cellular systems are not well suited for analyzing and encoding TTY signals. In fact, it has been shown that when TTY signals are analyzed, encoded and transmitted over a conventional digital cellular system, unacceptably high character error rates occur.

Transmitting TTY signals over digital cellular systems is problematic for reasons other than those directly related to the speech coders used in such systems. For instance, TTY signals, like other signals, may be degraded by various channel disturbances such as fading effects and interference. However, in a conventional digital cellular system, the effects of channel disturbances on speech signals can be mitigated by the speech decoder based on the characteristics of the speech signal itself. For example, there is generally a high degree of correlation between the spectrum of consecutive speech frames. Therefore, if the speech decoder detects that a particular speech frame has been lost or severely degraded, the speech decoder might assume that the specific parameters associated with the affected frame, such as the spectral parameters, are identical to the specific parameters associated with the previous speech frame. As the probability of this is relatively high, making this assumption will not, in general, severely impact end-user speech quality. Unfortunately, such a technique would not be suitable for TTY signals, since the information is carried in the spectrum of the signal. With respect to TTY signals, an assumption that one frame will exhibit similar spectral characteristics as those associated with the previous frame will lead to severe degradation of the TTY signal.

In fact, the TTY signal protocol described above includes no error detection or error correction provision. Thus, if one of the 5 bits in a 5 bit TTY signal sequence is erroneous, an incorrect character will, in all likelihood, be displayed at the receiving end. Moreover, the minimum length of time to transmit but one character is 165 msec, as shown in FIG. 1. As each speech coder frame has a length of 20 msec., at least 9 speech coder frames would be required to transmit a single TTY character. A channel error in but one of 9 frames will almost certainly result in a character error. Thus, the character error rate is roughly 9 times the frame erasure rate (FER). For speech signals, a FER of less than 1 percent is generally acceptable. A character error rate 9 times that, however, in a TTY connection is not acceptable.

For the reasons presented above, it would be desirable to provide a method and/or system that permits TTY signals, as well as other, similar low rate data signals, to be effectively transmitted over digital, cellular telecommunications networks. Otherwise, persons having hearing-impairments would be restricted to analog cellular systems, or be forced to accept the relatively poor performance offered by digital cellular systems.

SUMMARY OF THE INVENTION

The present invention involves transforming conventional TTY signals so that the resulting signals can be more effectively analyzed and encoded by a speech encoder, and transmitted over a digital cellular system. Although the present invention focuses on TTY signals, the present invention is not restricted thereto. The present invention can be employed to more effectively transmit any low rate data signal over a digital cellular network, such as a dual-tone multiple frequency signal. In general, the present invention accomplishes this by providing a low rate data encoder in the transmission path of the TTY signal, just prior to the speech encoder used by the digital cellular system. In so doing, the FSK modulated TTY signal (i.e., the conventional TTY signal) is transformed into a signal that is more compatible with the speech encoder used in conventional, digital cellular systems. Similarly, a low rate data decoder is provided at the receiving end of the transmission path, after the speech decoder in the digital cellular system has decoded the received signal.

Accordingly, it is an objective of the present invention to improve the coding and transmission performance of low rate data signals over a digital cellular network.

It is also an objective of the present invention to improve the coding and transmission performance of TTY signals in a digital cellular network.

It is yet another objective of the present invention to provide more effective cellular telecommunications services to hearing impaired persons.

It is still another objective of the present invention to improve the coding and transmission performance of low rate data signals, such as TTY signals, in a conventional digital cellular network without having to modify the existing digital cellular network or the digital cellular terminals (e.g., cellular phones).

In accordance with one aspect of the present invention, the above-identified and other objectives are achieved by a system that is capable of encoding and transmitting both speech signals and low rate data signals in a digital cellular network. The system involves a low rate data source that is capable of generating a low rate data signals. A low rate data encoder then receives the low rate data signals and transforms them into modified low rate data signals. A speech encoder is then employed to encode both the speech signals and the modified low rate data signals, prior to signal transmission over a corresponding communications link, wherein the low rate data encoder transforms the low rate data signals into modified low rate data signals so that the low rate data signals are specifically compatible with the speech encoder.

In accordance with another aspect of the present invention, the above-identified and other objectives are achieved by method for employing a speech encoder in a digital cellular telecommunication system to encode and transmit both speech signals and teletype (TTY) signals, where the TTY signals are generated by a telecommunications device for the deaf (TDD). The method involves monitoring an input signal that is to be transmitted over a communication link and determining whether that input signal is a speech signal or a TTY signal. If it is determined that the input signal is a TTY signal, the TTY signal is encoded into a sequence of character codes, where each character code comprises a number of bits and where each character code represents a single character. A channel protection code is then appended to each character code. Thereafter, a modified TTY signal is generated by modulating the sequence of character codes so that the modified TTY signal is compatible with the speech encoder. The modified TTY signal is then forwarded to the speech encoder.

BRIEF DESCRIPTION OF THE FIGURES

The objectives and advantages of the present invention will be understood by reading the following detailed description in conjunction with the drawings, in which.

DETAILED DESCRIPTION OF THE INVENTION

Figure 2:
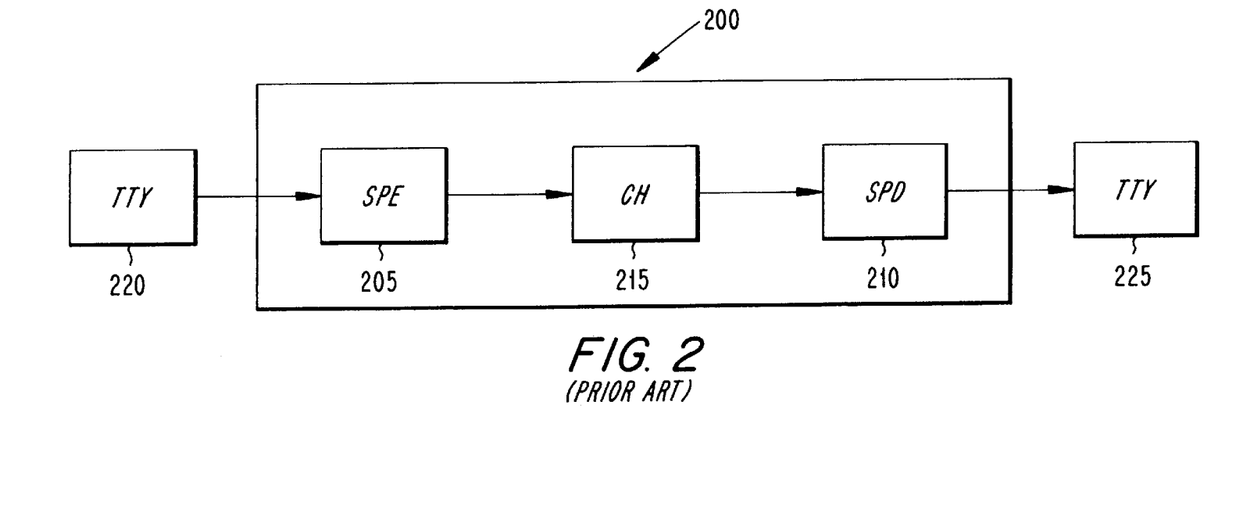
FIG. 2 illustrates a conventional speech encoding system.

FIG. 2 illustrates the elements associated with a conventional speech encoding system 200, such as one that might be employed in a conventional, digital cellular network. It will be noted that while cellular telephone systems are normally full duplex systems, FIG. 2, for the purpose of simplicity, illustrates only one of the two links that otherwise make up a full duplex channel. As shown, the speech encoding system 200 comprises a low rate speech encoder 205 located at the transmitting end of the communication link, and a low rate speech decoder 210 located at the receiving end of the communication link. Between the speech coder 205 at one end of the communication link and the speech decoder at the other end of the communication link is, among other things, the radio channel 215. If the speech encoding system 200 is used for transporting TTY signals, the TTY signals generated by the TTY 220 are directly applied to the input of the speech encoding system 200 (e.g., the input to a cellular telephone unit).

Typically, low rate speech encoders, such as speech encoder 205, employ speech production models for analyzing and encoding speech signals. These models often include a spectral formant filter, pitch filters, fixed codebooks and gain values, which are particular to speech signals. Accordingly, signals other than pure speech signals, for example TTY signals, modem signals and DTMF signals, will be reproduced with low fidelity.

Figure 3:
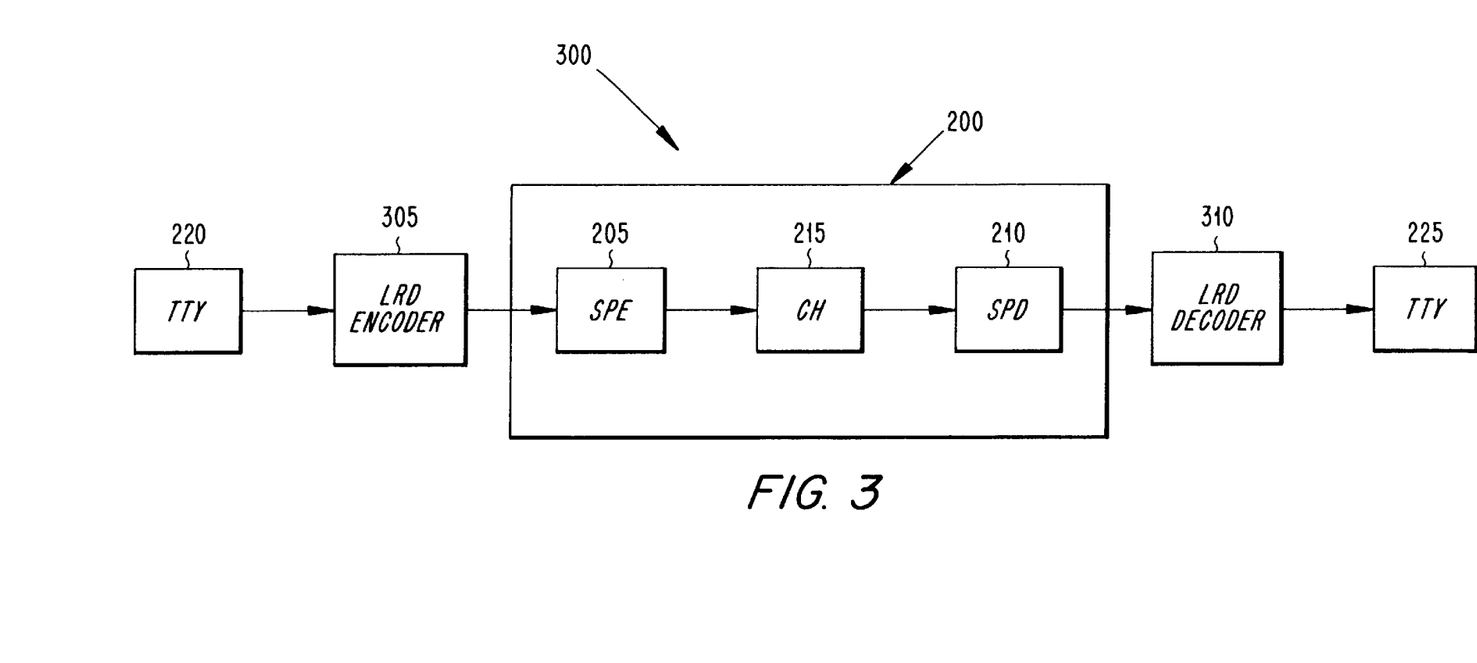
FIG. 3 illustrates a speech encoding system in accordance with exemplary embodiments of the present invention.

FIG. 3 illustrates a speech encoding system 300, in accordance with exemplary embodiments of the present invention. In contrast to the speech encoding system 200, speech encoding system 300 includes a low rate data (LRD) encoder 305, which is located between the TTY 220 and the speech encoder 205 at the input of the speech encoding system 200. Speech encoding system 300 also includes a LRD decoder 310 located between the TTY 225 and the speech decoder 210 at the output of the speech encoding system 200. In accordance with this exemplary embodiment, the standard TTY signal (i.e., the 45.45 bit/sec FSK modulated signal) generated by TTY 220 is no longer applied to the speech encoder 205. Instead, the LRD encoder 305 transforms the standard TTY signal generated by TTY 220 into a modified TTY signal. The modified TTY signal, as will be explained in greater detail below, is formatted in such a way that it is compatible with conventional speech encoders, such as speech encoder 205. Accordingly, the modified TTY signal is applied to the speech encoder 205.

At the receiving end of the communication link illustrated in FIG. 3, the LRD decoder 310 transforms the received signal back into a standard TTY signal. The standard TTY signal is then forwarded to TTY 225. TTY 225 then decodes the conventional TTY signal into the appropriate characters, which are displayed for the receiving party.

Figure 4:
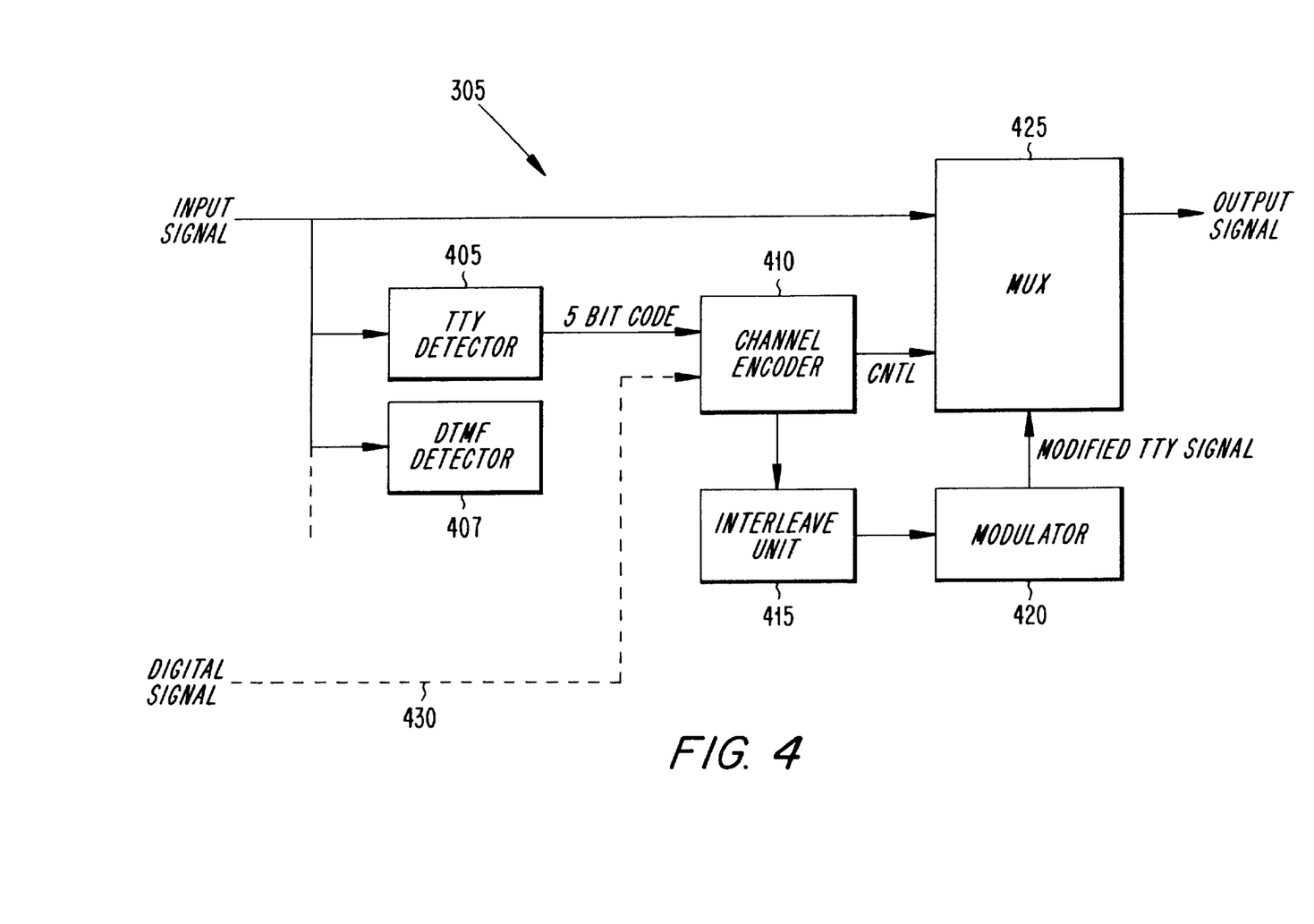
FIG. 4 illustrates a low rate data encoder in accordance with exemplary embodiments of the present invention.

FIG. 4 illustrates, in greater detail, LRD encoder 305, in accordance with exemplary embodiments of the present invention. As shown, LRD encoder 305 comprises one or more LRD signal detectors, such as TTY detector 405 and DTMF detector 407. In addition, LRD encoder 305 includes a channel encoder 410, an interleave unit 415, a modulation unit 420, and a multiplexer 425.

As is typically the case, the input signal may be either a LRD signal, such as a standard TTY signal, or a speech signal. Moreover, one skilled in the art will appreciate that the input signal may be an analog signal, a digital signal or a digital representation of an analog signal. One skilled in the art will also appreciate that if the input signal is an analog signal, implementing the LRD encoder 305 with digital components would, therefore, require that the LRD encoder 305 include an analog-to-digital conversion device to convert the analog input signal into a digital signal. In any event, if the input signal is a speech signal, it will be forwarded directly to the output of the multiplexer 425. However, if the input signal is a LRD signal, the input signal will be detected by the appropriate LRD detector, depending on the signal type (e.g., depending on whether the signal is a TTY signal or a DTMF signal). If, for example, the signal is determined to be a TTY signal, the TTY detector 405 will generate, from the standard TTY signal, a digital, 5 bit TTY character code, which is then forwarded to the channel encoder 410, as shown. It should be noted that in accordance with a preferred embodiment of the present invention, the presence of the LRD encoder 305 is transparent to speech signals. To ensure this, the output of multiplexer 425 will be connected to the output of modulator 320 only when a TTY signal is actually detected by TTY detector 405. When the TTY detector 405 no longer detects the presence of a TTY signal, the output of multiplexer 425 will automatically be switched back so that the it is connected to the input signal.

The channel encoder 410, upon receiving the signal from the TTY detector 405, adds channel protection by appending, for example, an N bit channel protection code for each 5 bit character code sequence. The N bit channel protection code may, for example, be a simple repetition code, where each data bit is repeated a predetermined number of times (e.g., 5 times). If such a channel protection scheme is employed, the LRD decoder could employ a simple majority decision algorithm to decode the received signal. Other alternative channel protection schemes include block codes and convolutional codes, which are well-known in the art.

The channel encoder 410 may also append additional bits, in the form of a header code, wherein the header code is to be used by the LRD decoder 310 to identify the signal type (e.g., to identify the signal as a TTY signal). If, of course, the LRD encoder 305 is handling only one type of LRD signal, for example, only TTY signals, there is no need to append signal identification information.

The channel encoder 410 then forwards the resulting signal to the interleave unit 415. The interleave unit 415, as one skilled in the art will readily appreciate, scrambles the channel encoded bit sequence by spreading the bits associated with each character over time. For instance, if a repetitive channel protection code, as described above, is employed, the repeated five data bits may be spread over five different 20 msec intervals, thereby spreading the information over each of five different speech frames. In doing so, the signal becomes more robust and, therefore, less susceptible to interference, fading and other radio channel disturbances.

The interleaved signal is then passed on to modulator 420, which transforms the interleaved signal into the aforementioned, modified TTY signal. An important factor to consider in determining how to best modulate the interleaved signal is the ratio between the bit rate of the original TTY signal (i.e., 45.45 bits/sec) and the bit rate of the speech encoder 205. In accordance with exemplary embodiments of the present invention, a binary FSK modulation scheme using frequencies at 750 Hz and 1500 Hz is employed, with a bit interval of 4 msec. The fact that the two frequencies are relatively far apart simplifies the task of bit detection for the LRD decoder 310, and it facilitates greater bit rates, which in turn, allows for the use of error correction coding and interleaving as described above. The modified TTY signal is then forwarded to multiplexer 425, which passes the modified TTY signal to the input of the speech encoding system 200, as illustrated in FIG. 3.

It will be further noted that during an initialization stage, the LRD encoder 305 will perform a connection check procedure, wherein the LRD encoder 305 sends an inquiry signal to the LRD decoder 310. The LRD decoder 310, upon receiving the inquiry signal, sends back an acknowledgement signal. If, however, LRD encoder 305 receives no acknowledgement signal, thereby indicating a problem or a lack of an LRD decoder 310 at the receiving end of the communications link, the LRD signal, for example, the standard TTY signal generated by the TTD 220 will be transmitted.

In an alternative embodiment, the LRD encoder 305 is integrated into the TTY 220. In accordance with this alternative embodiment, detection would be unnecessary and the digital 5 bit character code sequences would be passed directly to the channel encoder 410, as illustrated by exemplary digital input signal 430.

Figure 5:
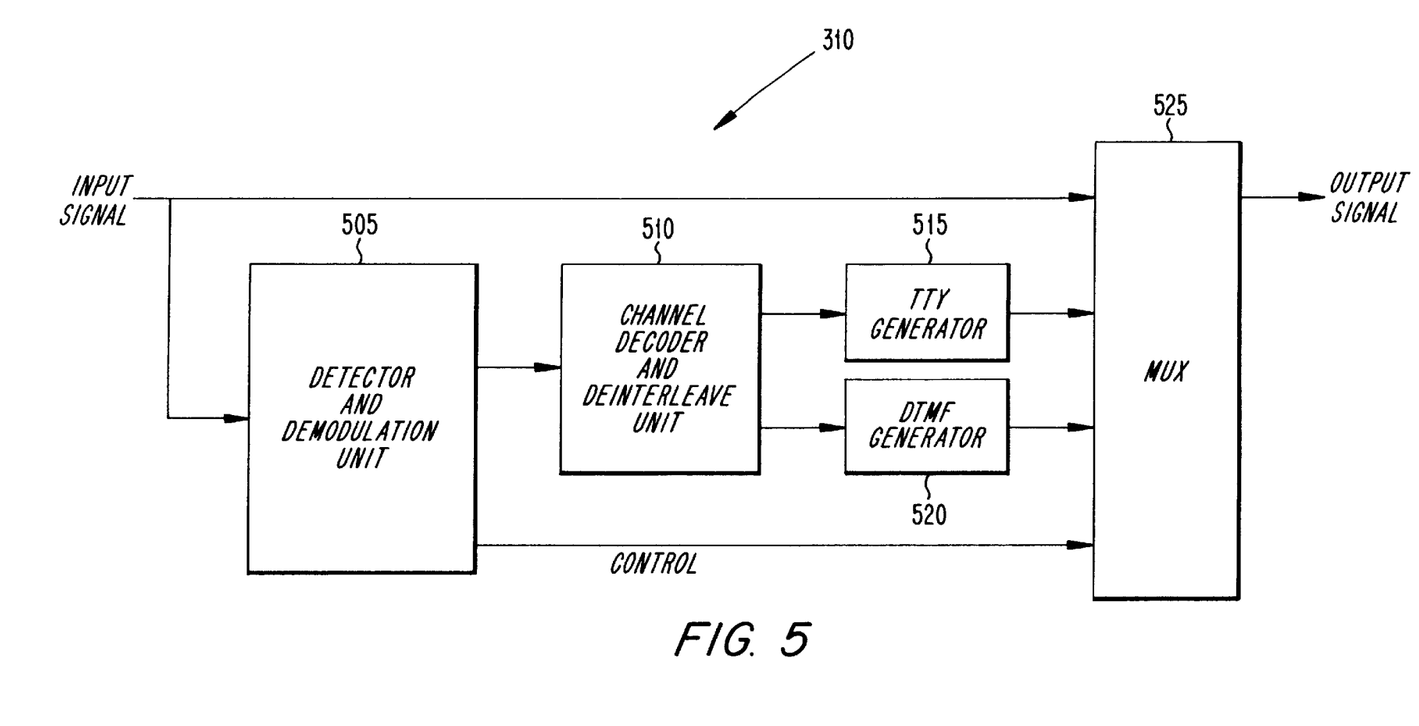
FIG. 5 illustrates a low rate data decoder in accordance with exemplary embodiments of the present invention.

FIG. 5 illustrates, in greater detail, the LRD decoder 310 in accordance with exemplary embodiments of the present invention. As shown in FIG. 5, LRD decoder 310 comprises a detection and demodulation unit 505, a channel decoder and deinterleave unit 510, LRD generators for each type of LRD signal, for example, a TTY generator 515 and a DTMF generator 520. In addition, the LRD decoder 310 includes a multiplexer 525. Again, one skilled in the art will appreciate the fact that the input and output signals may be analog signals, digital signals or digital representations of analog signals. However, in a preferred embodiment, the LRD decoder 310 would be implemented using digital components. Accordingly, analog-to-digital and digital-to-analog conversion may be required if the input and/or output signals are, in fact, analog signals.

As illustrated in FIG. 5, the detection and demodulation unit 505 monitors the input signals (i.e., the output signals from speech encoding system 200). If the incoming signal does not reflect the characteristics of a modified LRD signal, such as a modified TTY signal, the input signal is forwarded directly to multiplexer 525. If, however, it is determined that the input signal does reflect the characteristics of a modified LRD signal, the input signal will be demodulated by the detection and demodulation unit 505, and the resulting digital bit stream will be forwarded to the channel decoder and interleave unit 510. Header information added to the bit sequence by the channel encoder 410 in the LRD encoder 305 is then used by the channel decoder and interleave unit 510 to determine the signal type (e.g., whether the LRD signal is a TTY signal or a DTMF signal). Assuming that the signal is determined to be a TTY signal, the decoded, 5 bit character code sequence is forwarded to the TTY generator 515, which produces a corresponding standard TTY signal. The standard TTY signal is then forwarded to the multiplexer 525, which in turn, forwards the standard TTY signal to TTY 225, as illustrated in FIG. 3.

Again, it is preferable that the LRD decoder 310 is completely transparent to speech signals. Accordingly, the output of multiplexer 525 will be connected to the appropriate LRD generator only when a LRD signal is present.

Otherwise, the output of multiplexer 525 will be connected to the input signal.

In accordance with another alternative embodiment of the present invention, the LRD encoder 305 is integrated into the speech encoder 205, while the LRD decoder 310 is integrated into the speech decoder 210. The primary drawback associated with this alternative embodiment, however, is that it would require a modification to existing cellular equipment.

Figure 6:
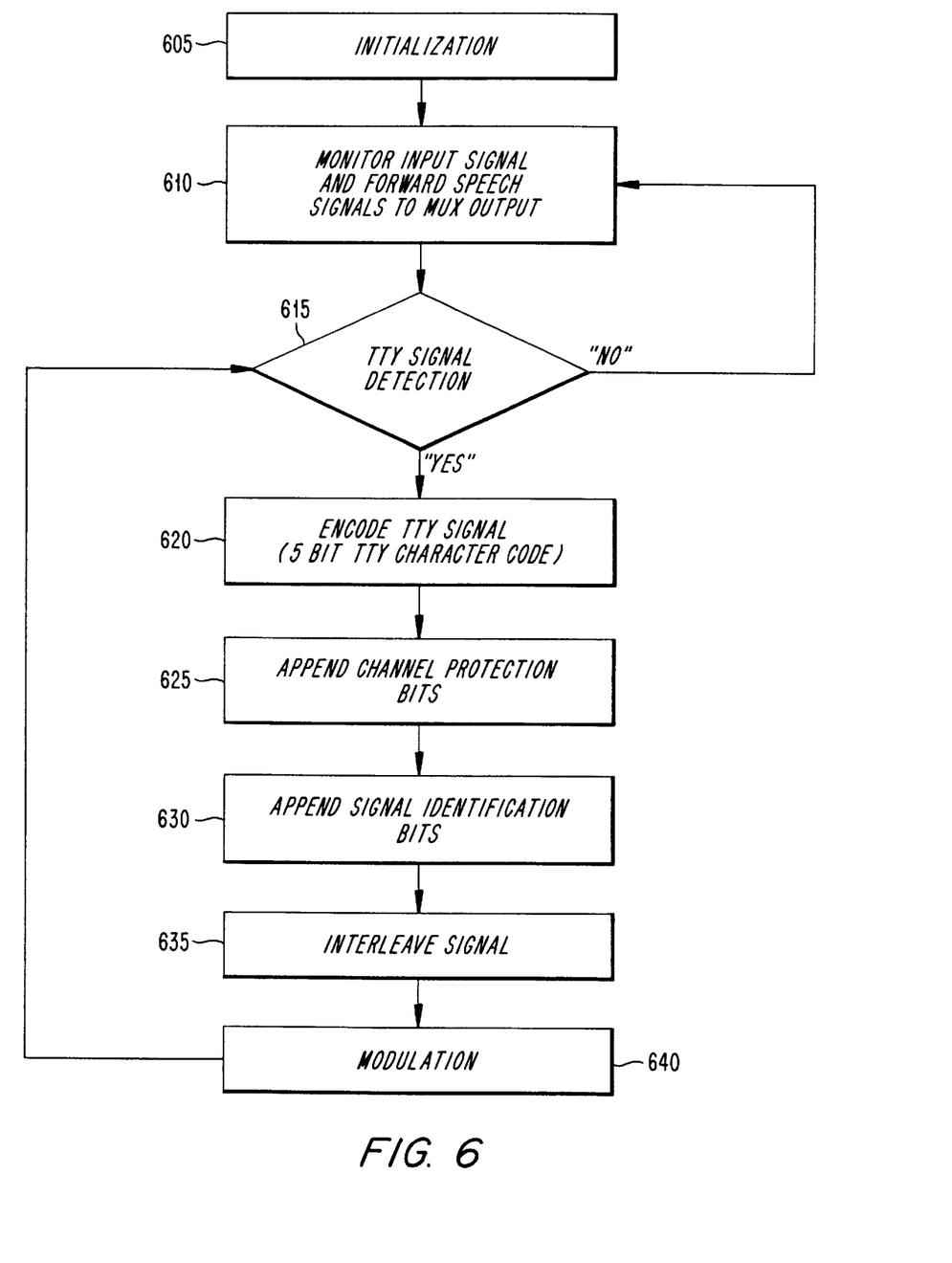
FIG. 6 illustrates a method that may be employed in conjunction with a low rate data encoder, in accordance with exemplary embodiments of the present invention.

FIG. 6 is a flowchart which illustrates the basic method employed by the LRD encoder 305, in accordance with exemplary embodiments of the present invention. As shown, the LRD encoder first performs an initialization, as indicated by step 605. During initialization, the LRD encoder 305 transmits an inquiry signal over the communication link. If an LRD decoder 310 at the receiving end of the communication link receives the inquiry signal, the LRD decoder 310 will respond by transmitting an acknowledgment signal back to the LRD encoder 305. Only if the LRD encoder 305 receives an acknowledgment signal from the LRD decoder 310 will the LRD encoder 305 begin actively monitoring the analog input signal for the presence of LRD signals (e.g., TTY signals).

Assuming the LRD encoder 305 does, in fact, receive an acknowledgment signal from the LRD decoder 310, the TTY detector 405 will begin monitoring the analog input signal, as shown in step 610, and determine whether a TTY signal is present, as indicated by decision step 615. As long as the TTY detector 405 determines that no TTY signal is present, in accordance with the NO path out of decision step 615, the TTY detector will continue to monitor the analog input, while speech signals will be automatically forwarded to the output of the multiplexer 425. If, and only if, the TTY detector 405 determines that a TTY signal is present, in accordance with the YES path out of decision step 615, will the analog input signal be forwarded to the TTY detector for encoding, as indicated by step 620.

The encoded, 5 bit TTY character code generated by the TTY detector 405 is then forwarded to the channel encoder 410, which appends additional data bits for channel protection purposes, in accordance with step 625, and, if necessary, additional data bits for signal identification purposes, in accordance with step 630. The interleave unit 415 then, as indicated by step 635, spreads the data bits over a predetermined number of speech frames to further protect the information against channel disturbances such as fading and interference. Then, as shown in step 640, the modulator 420 produces the modified TTY signal by modulating the interleaved signal in accordance with a FSK modulation scheme as described above. The modified TTY signal is then forwarded to the output of multiplexer 425.

Figure 7:
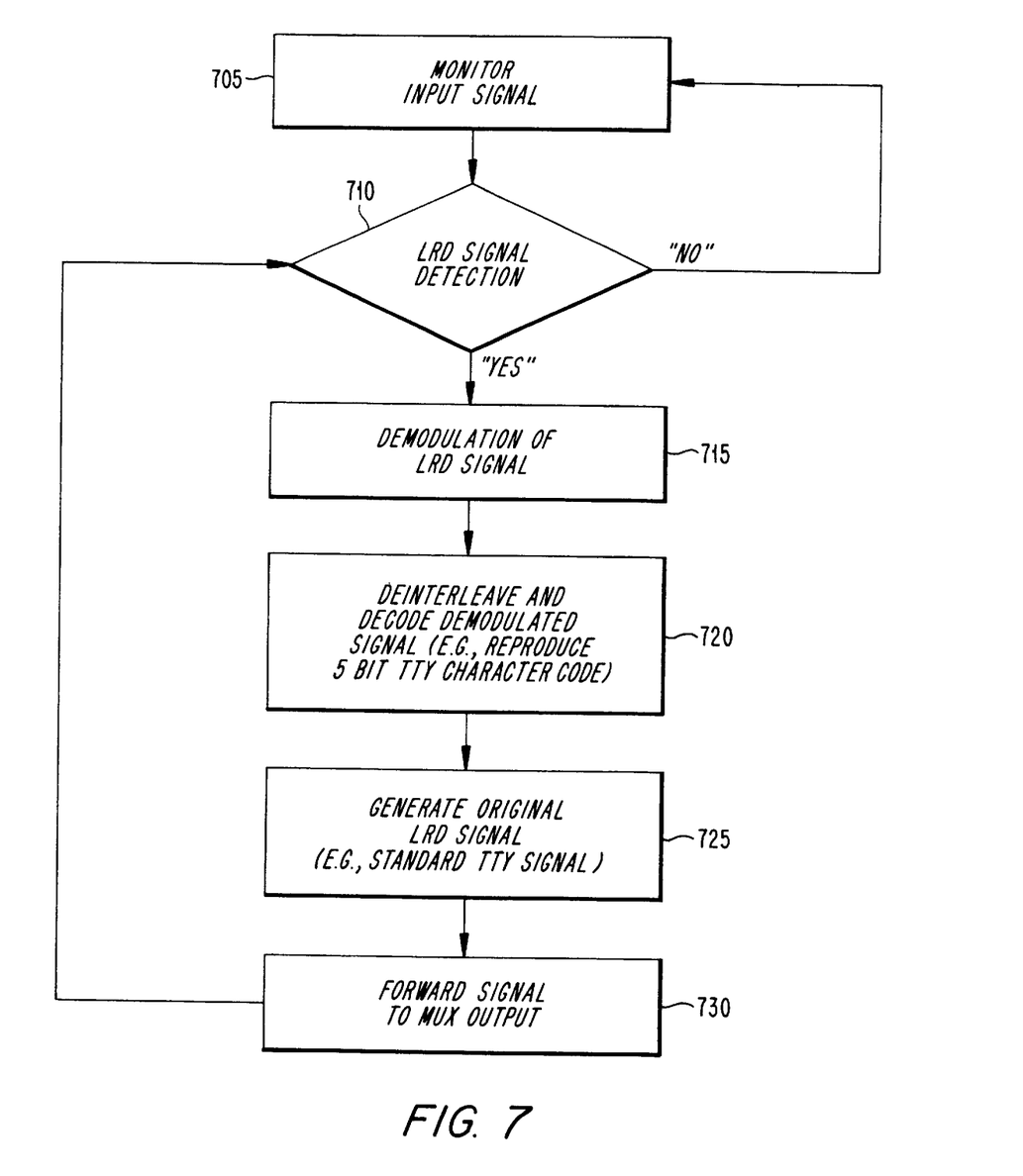
FIG. 7 illustrates a method that may be employed in conjunction with a low rate data decoder, in accordance with exemplary embodiments of the present invention

FIG. 7 is a flowchart which illustrates the basic method employed by the LRD decoder 310, in accordance with exemplary embodiments of the present invention. As illustrated, the detection and demodulation unit 505 in the LRD decoder 310 monitors the analog input signal, as indicated by step 705, and determines whether the input signal is an LRD signal (e.g., a modified TTY signal), in accordance with decision step 710. If it is determined that a LRD signal is not present, in accordance with the NO path out of decision step 710, the analog input signal is forwarded directly to the output of multiplexer 525. If, however, it is determined that an LRD signal (e.g., a modified TTY signal) is present, in accordance with the YES path out of decision step 710, the input signal will be demodulated, by the detection and demodulation unit 505, and forwarded to the channel decoder and deinterleave unit 510, as indicated by step 715. Then, in accordance with step 720, the decoder and deinterleave unit 510 decodes the demodulated signal, thereby reproducing a 5 bit character code sequence in the case of a TTY signal. The resulting sequence is then forwarded to the appropriate LRD generator, for example, the TTY generator 515, based on the signal identification information appended to the signal by the channel encoder 410 in the LRD encoder 305. The LRD generator then reproduces the original, analog LRD signal, in accordance with step 725, which is forwarded to the output of the multiplexer 525, in accordance with step 730.

The present invention has been described with reference to exemplary embodiments. However, it will be readily apparent to those skilled in the art that it is possible to embody the invention in specific forms other than those described above without departing from the spirit of the invention. The various aspects and exemplary embodiments are illustrative, and they should not be considered restrictive in any way. The scope of the invention is given by the appended claims, rather than the preceding description, and all variations and equivalents thereof which fall within the range of the claims are intended to be embraced therein.

What is claimed is:

1. In a digital cellular system, a speech encoding system capable of encoding and transmitting both speech signals and low rate data signals comprising:

a low rate data source capable of generating low rate data signals;

a low rate data encoder for receiving the low rate data signals and transforming the low rate data signals into modified low rate data signals; and a speech encoder for receiving and encoding both speech signals and modified low rate data signals, prior to the signals being transmitted over a corresponding communications link, wherein the low rate data encoder transforms the low rate data signals so that they are specifically compatible with the speech encoder.

2. The speech encoding system of claim 1, wherein the low rate data encoder comprises:

a low rate data signal detector for detecting whether an input signal is a speech signal or a low rate data signal;

a channel encoder connected to said low rate data connector, wherein said channel encoder appends a channel protection code to low rate data input signals; and a modulator for transforming low rate data input signals into modified low rate data signals that are compatible with the speech encoder.

3. The speech encoding system of claim 2, wherein the channel encoder comprises:

means for appending signal identification information to low rate data signals, and wherein the signal identification information identifies signal type.

4. The speech encoding system of claim 2, wherein said low rate data encoder further comprises an interleave unit connected between the channel encoder and the modulator, wherein the interleave unit is capable of spreading information bits associated with the low rate data signals over a predetermined number of speech frames so as to render the low rate data signals less susceptible to radio channel disturbances.

5. The speech encoding system of claim 2, wherein the low rate data signal detector is a TTY signal detector.

6. The speech encoding system of claim 2, wherein said low rate data signal detector is a dual-tone multiple frequency detector.

7. A method for employing a speech encoder in a digital cellular telecommunication system to encode and transmit both speech signals and teletype (TTY) signals generated by a telecommunications device for the deaf (TDD), said method comprising the steps of:

monitoring an input signal to be transmitted over a communication link;

determining whether the input signal is speech signal or a TTY signal;

if it is determined that the input signal is a TTY signal, encoding the TTY signal into a sequence of character codes, wherein each character code comprises a number of bits and wherein each character code represents a single character;

appending a channel protection code to each character code;

generating a modified TTY signal by modulating the sequence of character codes so that the modified TTY signal is compatible with the speech encoder; and forwarding the modified TTY signal to the speech encoder.

8. The method of claim 7 further comprising the step of:

forwarding the input signal directly to the speech encoder if it is determined that the input signal is a speech signal.

* * * * *